(12) United States Patent
Perez et al.

(10) Patent No.: US 7,157,062 B2
(45) Date of Patent: Jan. 2, 2007

(54) INHIBITION OF THE DEPLETION OF METAL VALUES FROM PREGNANT LIXIVIANT SOLUTIONS

(75) Inventors: Libardo A. Perez, Morrisville, PA (US); David M. Polizzotti, Yardley, PA (US)

(73) Assignee: GE Betz, Inc., Trevose, PA (US)

( * ) Notice: Subject to any disclaimer, the term of this patent is extended or adjusted under 35 U.S.C. 154(b) by 616 days.

(21) Appl. No.: 10/417,910

(22) Filed: Apr. 17, 2003

(65) Prior Publication Data

US 2003/0228245 A1 Dec. 11, 2003

Related U.S. Application Data

(63) Continuation-in-part of application No. 10/163,700, filed on Jun. 5, 2002, now abandoned.

(51) Int. Cl.
*C22B 11/00* (2006.01)

(52) U.S. Cl. .............. 423/25; 423/27; 423/29; 423/30; 423/31

(58) Field of Classification Search ............ 423/25, 423/27, 29, 30, 31
See application file for complete search history.

(56) References Cited

U.S. PATENT DOCUMENTS 4,110,539 A  8/1978  Albers et al.
4,269,730 A  5/1981  Wechsler et al.
4,929,274 A  5/1990  Luttinger
5,180,847 A  1/1993  Thurman et al.
5,744,063 A  4/1998  Desai et al.
6,025,522 A  2/2000  Cox et al.

FOREIGN PATENT DOCUMENTS

CA  1062918  9/1979
SU  451756  11/1974
ZA  919627  12/1991

OTHER PUBLICATIONS

CAS 67762-19-0, no date.
CAS 68515-73-1, no date.
CAS 68604-71-7, no date.
CAS 68608-64-0, no date.
CAS 110615-47-9, no date.
CAS 125997-22-0, no date.

*Primary Examiner*—Steven Bos
(74) *Attorney, Agent, or Firm*—Wegman, Hessler & Vanderburg

(57) ABSTRACT

Methods for inhibiting depletion of mineral values from pregnant lixiviant solutions comprise contacting the requisite metal ore with a preg-robbing inhibition agent (PRIA) comprising (I) alkyl polyglucoside surfactants; (II) imidazoline based amphoteric surfactants; (III) hydroformylation products of lower ($C_2$–$C_8$) alkanes in an organic solvent medium, and (IV) esters and aldehydes.

13 Claims, No Drawings

INHIBITION OF THE DEPLETION OF METAL VALUES FROM PREGNANT LIXIVIANT SOLUTIONS

CROSS REFERENCE TO RELATED APPLICATION

The present application is a continuation-in-part of application Ser. No. 10/163,700 filed Jun. 5, 2002 now abandoned, the priority benefit of which is hereby claimed.

FIELD OF THE INVENTION

The present invention relates to methods for inhibiting the "robbing" or depletion of metal values from "pregnant" lixiviant solutions that have extracted the desired metal value from the requisite ore.

BACKGROUND OF THE INVENTION

Leaching is a cost effective method for recovering precious metals such as gold or silver from ores. In the process, a lixiviant system, comprising a ligant and an oxidant is used to dissolve out the desired precious metal from the ore. As used herein, the phrases "lixiviant system" and "lixiviant solution" will be used interchangeably and do not imply a true chemical solution—only a chemical combination adapted to extract the mineral value in the ore.

In heap leaching, the metal bearing ore may be obtained from an open pit mine or the like and is crushed to produce an aggregate that is coarse enough to expose the desired mineral values but fine enough to allow intimate contact of the lixiviant system or solution therewith. The lixiviant solution may be distributed over the top of the metal ore heap via sprinklers, wobblers, or other similar equipment. The barren lixiviant "percolates" through the heap to perform its desired function with the metal and the resulting "pregnant" solution is then collected by an impervious leach pad or the like located at the bottom of the heap. The pregnant solution is then subjected to conventional mineral recovery techniques to obtain the desired precious metal.

In gold heap mining operations, a lixiviant system comprising cyanide, air and lime is commonly used under highly alkaline conditions (pH 9–11.5) to form the pregnant solution, (i.e., a complex or ligand coordinated with a gold cation). The gold cation complex or ligand leaches from the ore heap and is recovered. The gold is then separated from the lixiviant complex via conventional separation techniques such as the conventional method of adsorption on an activated carbon column or bed.

It has been discovered that in some leach mining operations, the metal ore itself can rob or adsorb the metal value that is complexed with the lixiviant in the pregnant lixiviant solution. That is, the amount of metal contained within the pregnant lixiviant solution is depleted by the metal ore itself. This undesirable action is referred to as "preg-robbing" since the pregnant lixiviant solution is robbed or depleted of the desired solubilized metal. Although applicants are not to be bound to any scientific explanation as to the reason for this phenomenon, it is thought that the problem may be caused by presence of graphite or other carbonaceous matter in the raw metal ore.

Presently, preg-robbing is inhibited by the addition of kerosene, which is highly flammable. In other cases, the ore is roasted or treated in autoclaves at high temperatures. These latter two alternatives are energy intensive, resulting in overall high metal recovery costs.

It is therefore an object to provide an effective alternative to present day preg-robbing inhibition treatments and methods.

SUMMARY OF THE INVENTION

The present invention is directed toward methods for inhibiting the depletion of metal values from pregnant lixiviant solutions in which certain preg-robbing inhibition agents are brought into contact with the metal ore. The preg-robbing inhibition agent (PRIA) may, for example, be applied by itself to the heaped metal ore either before or after the heap is formed. Also, the preg-robbing inhibition agents may be combined directly with the lixiviant for concurrent percolation of the combined lixiviant/PRIA throughout the heaped mass.

The PRIAs may be brought into contact with the crushed metal ore via drip or spray application or may be applied as a foam to the ore. Generally from about 0.005–0.024 kg to about 6.0 kg of the PRIA are applied to the metal ore based upon 1 ton of the ore. More preferably, about 0.5 kg to about 2.0 kg of PRIA are applied per ton of ore. Also, the PRIAs may be used in combination with other conventional treatments.

Other objects and advantages of the invention will be apparent from the following description and the appended claims.

DETAILED DESCRIPTION OF THE PREFERRED EMBODIMENT

The preg-robbing inhibition agents in accordance with the invention can be chosen from the Groups I–IV as explained hereinafter.

I.

Group I comprises non-ionic surfactants that are members of the alkyl polyglucoside class. These are the mono and oligomeric alkyl polyglucosides having alkyl groups of about 4–20 carbon atoms, preferably about 8 to about 16 carbon atoms and from about 1–4 glucose units. Preferred alkyl polyglucosides are alkyl and (+B) mono and oligo glucopyranoside (CASRN 110615-47-9); D-Glucose, decyl, octyl ethers, oligomeric (CAS No. 68515-73-1); and mixtures of an alcohol ethoxysulfate (ammonium salt) poly (oxy-1,2-ethanediyl), alpha-sulfa-omega-hydroxy-$C_{10}$–$C_{16}$ alkyl ethers, ammonium salts, (CAS No. 67762–19–0), D-Glucose, decyl, octyl ethers oligomerics (CAS No. 68515–73–1) and D-glucopyranoside, $C_{10}$–$C_{16}$ alkyl oligomerics (110615–47–9).

II.

Group II comprises the imidazoline based amphoteric surfactants such as the amphopropionate, amphodipropionate, amphoacetate, and amphodiacetate surfactants. These are reported in U.S. Pat. No. 5,744,063, and as stated in that patent, they are prepared by reacting an aminoalkyl alkanol amine or an ethylene or propylene alkylene triamine with a fatty acid to form the desired substituted imidazoline. The so formed imidazoline is then hydrolyzed to an amido amine followed by alkylation of the product with a monohaloacetic acid or its sodium salt.

The preferred imidazoline amphoteric surfactants are the amphopropionates, amphodipropionates, amphoacetates and amphodiacetates. Exemplary members of this class include:
    disodium cocoamphodipropionate
    disodium capryloamphodipropionate
    disodium lauroamphodipropionate cocoamphodipropionic acid
sodium cocoamphopropionate
sodium capryloamphopropionate
alkyl imidazoline propionate ester
alkyl imidazoline propionate salt
oleoamphopropionic acid
disodium cocoamphodiacetate
disodium capryloamphodiacetate
disodium lauroamphodiacetate
disodium soyamphodiacetate
disodium wheat germ amphodiacetate
Especially preferred members of Group II are:
disodium capryloamphodiacetate
CAS 68608-64-0 and
disodium cocoamphodipropionate
CAS 68604-71-7

III.

As to the third group of compounds that may be used as preg-robbing inhibition agents, these may be described as hydroformylation products of lower alkenes ($C_2$–$C_8$; $C_2$–$C_4$ preferred), in a $C_3$–$C_{24}$ solvent medium.

The preferred composition III is

| | |
|---|---|
| 5–15% | 2-ethylhexanol (000104-76-7) |
| 1–5% | 2-methylpentanol (000105-30-6) |
| 1–5% | 2-ethylhexanal (000123-05-7) |
| 1–5% | 2-methylhexanol (000624-22-6) |
| 10–20% | ester alcohol and isomers |
| 60–80% | others |

IV.

The fourth group may be described as aldehyde or ester compounds that may preferably include the presence of bulkyl alkyl or other hydrocarbyl groups. It is thought that the aldehydes and esters adsorb at the active sites of the carbonaceous materials present in the ore. The performance of these aldehydes and esters is enhanced by the presence of bulky alkyl components which provide steric inhibition and prevent sorption of the soluble gold cyanide complexes on the carbonaceous material present on the mineral ore.

Group IV compounds may be represented by the formula

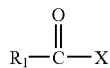

wherein $R_1$ is a $C_1$–$C_{12}$ hydrocarbyl radical; X is H, $OR_2$, or

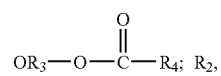

when present, is a $C_1$–$C_{12}$ hydrocarbyl radical; $R_3$ is a $C_1$–$C_{12}$ hydrocarbyl radical, and $R_4$ is H or a $C_1$–$C_{12}$ hydrocarbyl radical.

Preferred aldehydes and esters falling within Group IV include the following exemplary compounds:
aldehydes
formaldehyde
acetaldehyde
propionaldehyde
n-butyraldehyde
i-butyraldehyde
benzaldehyde
phenylacetaldehyde
α-methylvaleraldehyde
B-methylvaleraldehyde
Γ-methylvaleraldehyde
esters
methyl acetate
ethyl isovalerate
methyl succinate
isobutyl acrylate
hexyl butyrate
isohexyl butyrate
diesters
2,2,4-trimethyl-1,3-pentanediol diisobutyrate,
2-butene-1,4-diisobutyrate At present, hexylisobutyrate and 2,2,4-trimethyl-1,3-pentanediol diisobutyrate (DIB) are the more preferred members of Group IV with DIB presently the more preferred.

EXAMPLES

The invention will be further explained in conjunction with the following examples which are included for illustrative purposes only and are not to be construed as limitations to the invention.

Procedures for Cyanide Leaching of Preg-Robbing Ores

Procedure

Feed Sample Preparation

The ore sample is staged crushed to minus 10 mesh. A head sample is riffled out for analysis of Au, C (total) and C (graphitic). The remainder is riffled into test charges (500 g and/or 1000 g). These charges are then ground in a laboratory ball mill to achieve optimum size for extraction. The optimum size is determined by a series of grinding tests.

Cyanidation a) Carbon-in-Leach Cyanidation

In order to simulate carbon-in-leach (CIL) extraction, activated carbon (typically 20 g fresh, preattritioned, +16 mesh GRC-22 carbon presoaked in water for 24 hours is added to 500 g of the conditioned pulp. The required amount of sodium cyanide (1 g/L NaCN) is added, and the bottle is rolled for 48 hours. The cyanide and the pH are maintained at the desired levels (1 g/L NaCN and pH 11) during the leach.

Following CIL, the loaded carbon is recovered by screening on a 20 mesh screen. The carbon is washed and dried. The dry carbon is weighed and prepared for gold assay. The barren pulp is filtered, and the filter cake is washed with water. The filtrate and the wash are combined for gold analysis. Owing to the low concentration of gold in solution (<0.05 mg/L), 40 mL of solution is fire assayed. Following cupelling, the precious metal bead is dissolved in aqua regia to 10 mL for gold reading on an atomic adsorption spectrometer (AA). The combined barren wash solution is analyzed for residual NaCN and lime. The leach residue is dried, and a sample is riffled out for fire assay for gold using a 30-g sample.

b) Standard Cyanidation

The required amount of sodium cyanide (1 g/L NaCN) is added to the conditioned pulp, and the bottle is rolled for 48 hours. The cyanide and the pH are maintained at the desired levels (1 g/L NaCN and pH 11) during leaching. Solution samples (30–40 mL) are taken at 6, 24, and 32 hours into the leach for gold analysis. The bottle is weighed before each sampling time to determine the actual volume of solution in the bottle for calculation of the intermediate gold extraction.

Following leaching, the pulp is filtered and the filter cake is washed with water. The filtrate and the wash are combined for gold analysis. The leach residue is dried, and a sample is riffled out for fire assay for gold using 30-g sample.

Gold Extraction and Reagent Consumption

Gold extractions and sodium cyanide and lime (calculated a CaO) consumption are calculated from the analytical results and reported.

Test Results

Table 1 illustrates the efficacy of the treatments by themselves:

TABLE 1

Gold Preg-Robbing Tests

| Treatment Chemical Name | | Dosage kg/ton of ore | Treatment Time (hours) | Percent of Gold Extraction after 48 hours |
|---|---|---|---|---|
| None | | 0 | 0 | 14.6 |
| Kerosene | | 2.0 | 24 | 34.1 |
| Kerosene | | 4.0 | 24 | 35.8 |
| Alkyl ∀ (+B)-Mono and oligo glucopyranoside (CASRN 110615-47-9) | Ex. 1 | 4.0 | 24 | 29.5 |
| D-Glucose, decyl, octyl ethers, oligomeric (CAS No. 68515-73-1) | Ex. 2 | 4.0 | 24 | 41.3 |
| Mixture of ammonium laureth (CAS No. 67762-19-0) D-Glucose, decyl, octyl ethers - oligomeric (CAS No. 68515-73-1) and D-glucopyranoside, $C_{10}$–$C_{16}$ alkyl oligomeric (110615-47-9) | Ex. 3 | 4.0 | 24 | 33.9 |
| Disodium caprlyloamphodiacetate (CAS No. 68608-64-0) | Ex. 4 | 4.0 | 24 | 29.8 |
| Mixture of disodium cocoamphodiproponate (CAS No. 68604-71-7) | Ex. 5 | 4.0 | 24 | 35.2 |
| Mixture of 2-ethylhexanol; 2-methylpentanol; 2-ethylhexanal; 2-methylhexanol; ester alcohol and isomers; $C_3$–$C_{24}$ alcohols, aldehydes,and esters | Ex. 6 | 4.0 | 24 | 39.4 |

Table 2 illustrates the increase in efficacy when the treatments are blended with kerosene.

TABLE 2

Synergistic effect of treatments when blended with kerosene to a total dosage of 4 kg/t.

| Treatment | Ratio | Percent Gold of Gold Extraction after 48 hours |
|---|---|---|
| Ex. 2/Kerosene | 2/2 | 47.0 |
| Ex. 3/Kerosene | 2/2 | 43.7 |
| Ex. 1/Kerosene | 2/2 | 43.3 |

TABLE 2-continued

Synergistic effect of treatments when blended with kerosene to a total dosage of 4 kg/t.

| Treatment | Ratio | Percent Gold of Gold Extraction after 48 hours |
|---|---|---|
| Ex. 6/Kerosene | 2/2 | 45.2 |
| Ex. 2/Kerosene | 1/3 | 36.8 |
| Ex. 3/Kerosene | 1/3 | 43.3 |
| Ex. 1/Kerosene | 1/3 | 38.3 |
| Ex. 6/Kerosene | 1/3 | 43.9 |
| Kerosene* | — | 35.8 |

*4.0 kg/ton

Table 3 illustrated the increased in gold recovery when the treatment is used with activated carbon.

TABLE 3

Increase in Gold recovery when treatment is used with activated carbon.

| Treatment | Treatment Dosage kg/t | Activated Carbon G/L Solution | Percent of Gold Extraction after 48 hours |
|---|---|---|---|
| None | 0 | 0 | 6.8 |
| None | 0 | 20.0 | 68.2 |
| Ex. 6 | 0.024 | 20.0 | 72.5 |
| Ex. 6 | 0.050 | 20.0 | 73.5 |
| Ex. 6 | 0.075 | 20.0 | 74.9 |
| Ex 6 | 0.10 | 20.0 | 77.6 |
| Ex. 6 | 0.20 | 20.0 | 75.0 |
| Ex. 6 | 2.0 | 20.0 | 75.8 |
| Ex. 6 | 4.0 | 20.0 | 73.2 |
| Ex. 6 | 0.024 | 0 | 11.0 |
| Ex. 6 | 0.050 | 0 | 15.5 |
| Ex. 6 | 0.075 | 0 | 18.3 |
| Ex. 6 | 0.10 | 0 | 20.6 |
| Ex. 6 | 0.20 | 0 | 27.8 |
| Ex. 6 | 2.0 | 0 | 51.6 |
| Ex. 6 | 4.0 | 0 | 57.5 |

TABLE 4

Comparison of gold adsorption at 25 Kg/t Treatment Group IV Compounds

| | Gold Adsorption (mg/g) | | |
|---|---|---|---|
| Time (hours) | Control | Isobutyrate[1] | Diisobutyrate[2] |
| 0.0 | 0 | 0 | 0 |
| 0.5 | 6.19 | 6.20 | 2.23 |
| 1.0 | 10.34 | 6.41 | 4.43 |
| 2.0 | 14.46 | 10.55 | 6.62 |
| 4.0 | 18.53 | 14.65 | 10.75 |
| 7.0 | 22.56 | 18.72 | 12.88 |
| 24.0 | 30.04 | 28.55 | 24.69 |

[1]= hexylisobutyrate
[2]= DIB

Table 4 procedure. A weighted amount of activated carbon was added to a solution having a known concentration of gold. The amount of gold adsorbed onto the activated carbon as a function of time was determined in the presence and absence (control) of the treatment being evaluated. The smaller the amount of gold being adsorbed onto the activated carbon, the better the treatment is in preventing preg-robbing.

Although the invention finds specific utility in the field of inhibiting the depletion of gold from cyanide based lixiviants by heaped gold metal ore, it is also applicable to other mining environments such as precious metal heap mining in general.

The invention is generally applicable to methods of leaching metals from metal ores in which a lixiviant solution is placed in contact with the metal ore to extract the metal therefrom in the form of a pregnant lixiviant solution. As indicated previously, in some cases, the desired metal value is depleted from the pregnant lixiviant solution by contact of the pregnant lixiviant solution with the metal ore. In these methods, the improvement comprises contacting the metal ore with an effective amount of a preg-robbing inhibition agent comprising a member or members selected from the groups consisting of I, II, III, and IV as previously identified.

The invention may be further viewed as being useful in a metal pulp environment comprising a gold metal ore and a pregnant lixiviant solution containing gold cyanide complexes. The method is directed toward inhibition of the adsorption of the gold cyanide complexes by the gold metal ore and comprises contacting the gold metal ore with an effective preg-robbing inhibition agent comprising a member selected from the groups consisting of I, II, III, and IV and mixtures, as described above.

Additionally, the invention serves to improve gold extraction in gold refining processes in which activated carbon solutions are used to extract gold from pregnant lixiviant solutions.

While the present invention has been described with respect to particular embodiments thereof, it is apparent that other forms and modifications of the invention will be obvious to those skilled in the art. The appended claims and this invention generally should be construed to cover all such obvious forms and modifications which are within the true spirit and scope of the present invention.

What is claimed is:

1. In the leaching of gold from a gold metal ore in which a lixiviant solution is placed in contact with said gold metal ore to extract said gold therefrom in the form of a pregnant lixiviant solution, a method of inhibiting depletion of said extracted gold from said pregnant lixiviant solution, said method comprising contacting said gold metal ore with an effective amount of a preg-robbing inhibition agent (PRIA) comprising hydroformylation products of $C_2$–$C_8$ alkenes in a $C_3$–$C_{24}$ medium.

2. Method as recited in claim 1 wherein from about 0.024–about 6 kg of said PRIA is brought into contact with said gold metal ore based upon 1 ton of said gold metal ore.

3. Method as recited in claim 2 wherein from about 0.5–about 2.0 kg of said PRIA is brought into contact with said gold metal ore based upon 1 ton of said gold metal ore.

4. Method as recited in claim 1 wherein said pregnant lixiviant solution comprises a cyanide solution.

5. Method as recited in claim 1 wherein said $C_2$–$C_8$ alkene hydroformylation products comprise 2-ethylhexanol, 2-methylpentanol, 2-ethylhexanal; and 2-methyihexanol.

6. Method as recited in claim 5 wherein said preg-robbing inhibition agent further comprises kerosene.

7. In a metal pulp comprising a gold metal ore and a pregnant lixiviant solution containing gold cyanide complexes, a method of inhibiting adsorption of said gold cyanide complexes by said gold metal ore comprising contacting said gold metal ore with an effective preg-robbing inhibition agent (PRIA) comprising hydroformylation products of $C_2$–$C_8$ alkenes in a $C_3$–$C_{24}$ medium.

8. Method as recited in claim 7 wherein from about 0.024–about 6 kg of said PRIA is brought into contact with said gold metal ore based upon 1 ton of said gold metal ore.

9. Method as recited in claim 8 wherein from about 0.5 kg–about 2 kg of said PRIA is brought into contact with said gold metal ore based upon 1 ton of said gold metal ore.

10. Method as recited in claim 7 said hydroformylation products comprise 2-ethylhexanol, 2-methylpentanol, 2-ethylhexanol; and 2- methyihexanol.

11. Method as recited in claim 10 wherein said preg-robbing inhibition agent further comprises kerosene.

12. In a gold extraction process in which a lixiviant solution is brought into contact with a gold bearing ore to form a pregnant lixiviant solution, and wherein said pregnant lixiviant solution is contacted with activated carbon to aid in separating said gold from said pregnant lixiviant solution, the improvement comprising contacting said activated carbon with hydroformylation products of $C_2$–$C_8$ alkenes in a $C_3$–$C_{24}$ medium.

13. Process as recited in claim 12 wherein said hydroformylation products comprise 2-ethylhexanol, 2-methylpentanol, 2-ethylhexanal and 2-methylhexanol.

* * * * *